(12) United States Patent
Santhosh et al.

(10) Patent No.: US 8,821,106 B2
(45) Date of Patent: Sep. 2, 2014

(54) ROTOR COUPLING GUARD

(75) Inventors: Donkada Santhosh, Karnataka (IN);
Rohit Pruthi, Karnataka (IN); Vishwas Kumar Pandey, Karnataka (IN);
Abhishek Agrawal, Karnataka (IN)

(73) Assignee: General Electric Company, Schenectady, NY (US)

( * ) Notice: Subject to any disclaimer, the term of this patent is extended or adjusted under 35 U.S.C. 154(b) by 839 days.

(21) Appl. No.: 12/946,879

(22) Filed: Nov. 16, 2010

(65) Prior Publication Data
US 2012/0121374 A1 May 17, 2012

(51) Int. Cl.
*F01D 25/14* (2006.01)
*F04D 29/054* (2006.01)
*F16D 1/076* (2006.01)

(52) U.S. Cl.
CPC ............ *F16D 1/076* (2013.01); *F16D 2300/26* (2013.01); *F16D 2300/0212* (2013.01)
USPC ............................................. 415/1; 415/176

(58) Field of Classification Search
USPC ............. 415/216.1, 232, 122.1, 169.1, 169.3, 415/169.4, 1; 464/17, 170–172, 176, 177
See application file for complete search history.

(56) References Cited

U.S. PATENT DOCUMENTS

| | | | | |
|---|---|---|---|---|
| 5,257,905 A * | 11/1993 | Wynn et al. | ................. | 415/216.1 |
| 5,429,552 A * | 7/1995 | Scherner et al. | ................. | 464/17 |
| 6,190,261 B1 * | 2/2001 | Powell | ............................ | 464/170 |
| 6,474,934 B1 * | 11/2002 | Jahnke et al. | ...................... | 415/1 |
| 7,275,995 B2 * | 10/2007 | Doll | ............................... | 464/176 |
| 8,430,202 B1 * | 4/2013 | Mason et al. | .................. | 181/210 |
| 2004/0189119 A1 * | 9/2004 | Schmidt et al. | ................... | 310/89 |
| 2010/0236256 A1 * | 9/2010 | Hussain et al. | ................... | 60/785 |

* cited by examiner

*Primary Examiner* — Edward Look
*Assistant Examiner* — William Grigos
(74) *Attorney, Agent, or Firm* — Sutherland Asbill & Brennan LLP

(57) ABSTRACT

The present application provides a rotor coupling guard for use with removing a flow of air about a rotor coupling of a turbo-machine. The rotor coupling guard may include an inner cover with a number of apertures surrounding the rotor coupling and an outer cover surrounding the inner cover. Rotation of the rotor coupling forces the flow of air through the apertures in the inner cover and away from the rotor coupling.

15 Claims, 2 Drawing Sheets

ROTOR COUPLING GUARD

TECHNICAL FIELD

The present application relates generally to a turbo-machine such as a steam turbine and the like and more specifically relates to a rotor coupling guard for use with a rotor coupling of a turbo-machine.

BACKGROUND OF THE INVENTION

Generally described, turbo-machinery such as steam turbines and the like may include a number of rotors for the transmission of rotational power. For example, a first rotor may be driven by the turbine while a second rotor may be in communication with a driven device such as an electrical generator and the like. The rotors generally meet about a rotor coupling.

The rotor coupling generally is enclosed within a rotor coupling guard. The rotor coupling guard provides safety, windage resistance, and other types of operational benefits. A lack of mass transfer or heat transfer of the air trapped inside the rotor coupling guard, however, may increase the air temperature inside the rotor coupling guard. Specifically, the continuous friction between the rotating surfaces of the rotor coupling and the trapped air may cause an increase in the temperature within the rotor coupling guard. Moreover, the noise level also may be high due to the friction between the rotor coupling and the trapped air.

To cool down the temperature of the rotor coupling and the other components within the rotor coupling guard, oil cooling and/or induced fan cooling has been provided. Such cooling methods, however, generally require extra hardware and controls to provide for a continuous flow of a cooling medium such as oil and/or air. Further, the flow of oil therein has been known to escape as well as cook and smoke if the flow gets too hot.

There is a desire therefore for an improved rotor coupling guard for use with a rotor coupling and the like. Preferably, such an improved rotor coupling guard may continue to provide safety while also assisting in cooling the rotor coupling and the other components therein without the use of complex cooling hardware, mediums, and/or controls.

SUMMARY OF THE INVENTION

The present application thus provides a rotor coupling guard for use with removing a flow of air about a rotor coupling of a turbo-machine. The rotor coupling guard may include an inner cover with a number of apertures surrounding the rotor coupling and an outer cover surrounding the inner cover. Rotation of the rotor coupling forces the flow of air through the apertures in the inner cover and away from the rotor coupling.

The present application further provides a method of cooling a rotor coupling positioned within a rotor coupling guard. The method may include the steps of positioning an inner cover of the rotor coupling guard with a number of apertures therein to define an inner airspace between the rotor coupling and the inner cover, positioning an outer cover of the rotor coupling guard to define an outer airspace between the inner cover and the outer cover, and rotating the rotor coupling so as to force a flow of air about the rotor coupling and in the inner airspace through the apertures in the inner cover and into the outer airspace.

The present application provides a turbo-machine. The turbo-machine may include a rotor coupling and a rotor coupling guard with the rotor coupling therein. The rotor coupling guard may include an inner cover with a number of apertures therein such that rotation of the rotor coupling forces a flow of air through the apertures in the inner cover and away from the rotor coupling.

These and other features and improvements of the present application will become apparent to one of ordinary skill in the art upon review of the following detailed description when taken in conjunction with the several drawings and the appended claims.

DETAILED DESCRIPTION

Figure 1:
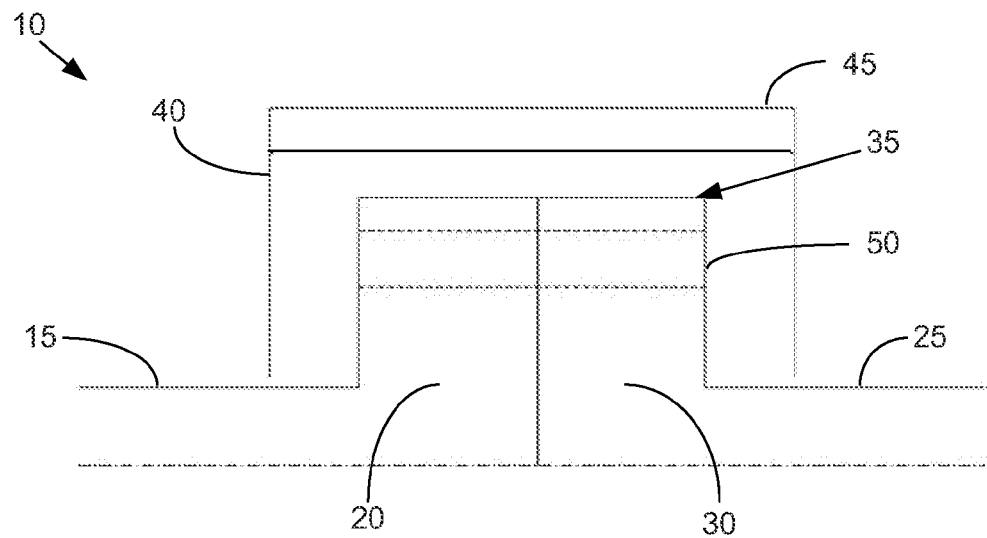
FIG. 1 is a schematic view of a portion of a known turbo-machine with a rotor coupling guard.

Referring now to the drawings, in which like numerals refer to like elements throughout the several views. FIG. 1 shows a portion of a known turbo-machine 10 such as a steam turbine and the like. A first rotor 15 with a first flange 20 may meet a second rotor 25 with a second flange 30 at a rotor coupling 35. As described above, the rotational power of the first rotor 15 thus may be transmitted to the second rotor 25 via the rotor coupling 35. Other configurations of rotors and rotor couplings may be used herein.

The rotor coupling 35 may be enclosed by a coupling guard 40. A number of different rotor coupling guard 40 configurations may be known. As described above, the air within the rotor coupling guard 40 may be heated due to friction with the rotor coupling 35. As a result, an external cooling system 45 may be positioned about the rotor coupling guard 40 with a flow of a cooling medium in communication with the rotor coupling 35. The cooling medium may be in communication with the rotor coupling 35 via a number of hydraulic couplings 50 such a bolts and the like extending therethrough. The cooling medium may be oil, air, and similar types of fluids. Other configurations and other components also may be used herein.

Figure 2:
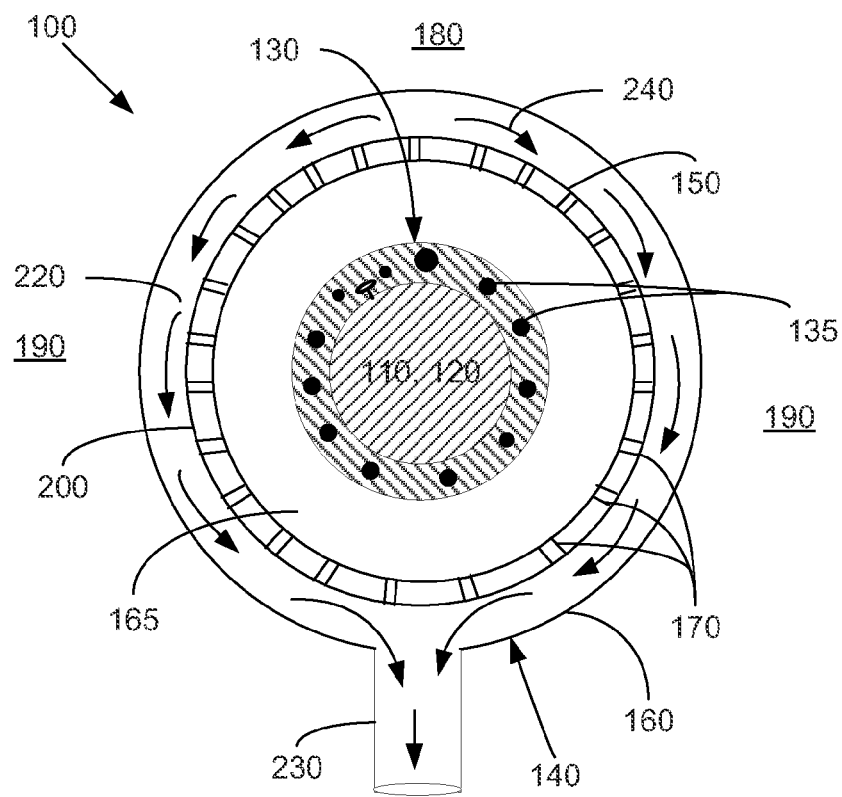
FIG. 2 is a side cross-sectional view of a turbo-machine with a rotor coupling guard as may be described herein.
Figure 3:
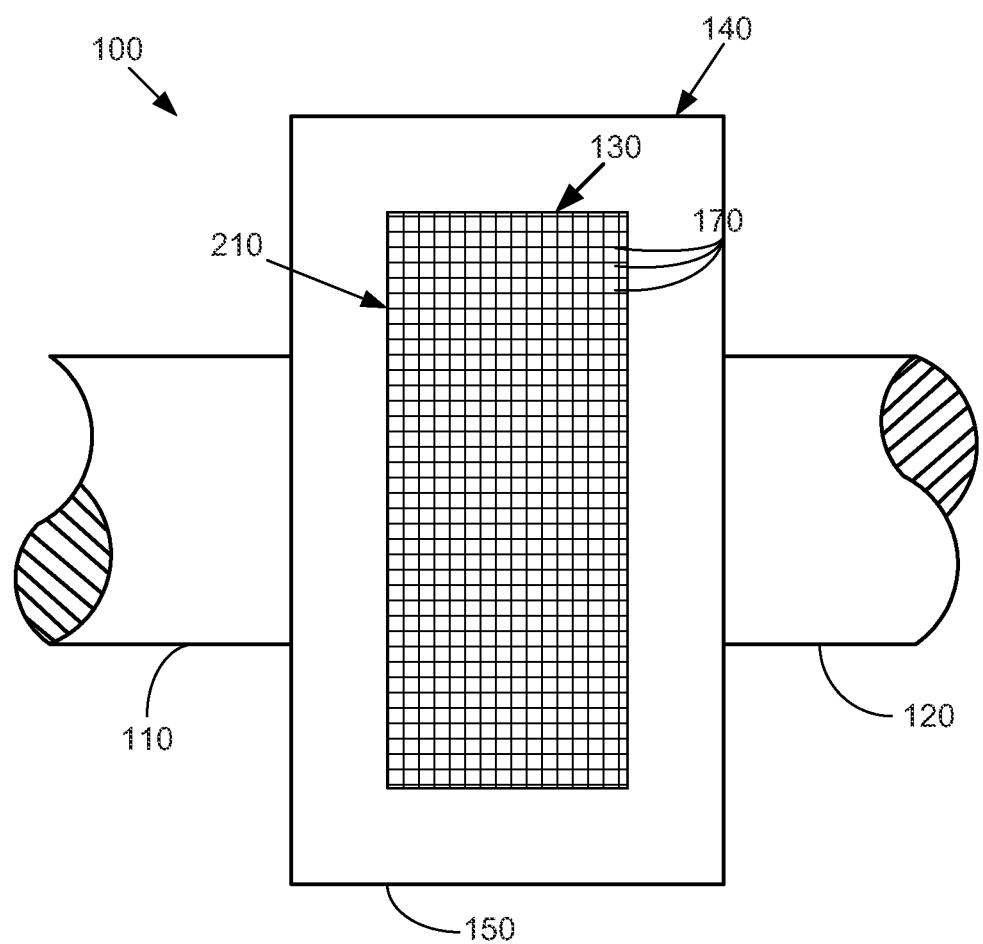
FIG. 3 is a top plan view of the rotor coupling guard of FIG. 2 with the outer cover removed.

FIGS. 2 and 3 show a portion of a turbo-machine 100 as may be described herein. As above, the turbo-machine 100 may be a steam turbine and other types of axial flow devices. As described above, the turbine machine 100 may include a first rotor 110, a second rotor 120, and a rotor coupling 130 therebetween. The rotor coupling 130 may include a number of hydraulic couplings 135 such as hydraulic bolts extending therethrough in communication with a cooling medium. Other configurations and other components may be used herein.

The rotor coupling 130 may be enclosed by a rotor coupling guard 140. The rotor coupling guard 140 may include an inner cover 150 and an outer cover 160. The inner cover 150 and the outer cover 160 may be made out of any type of substantially heat and corrosion resistant material. The size, shape, and diameter of the inner cover 150, the outer cover 160, and the rotor coupling guard 140 as a whole may vary.

The inner cover 150 may surround the rotor coupling 130. The inner cover 150 and the rotor coupling 130 may define an inner airspace 165 therebetween. The size, shape, and diameter of the inner airspace 165 may vary. The inner cover 150 may include one or more apertures 170 positioned therein. The one or more apertures 170 may be positioned at a top portion 180 of the inner cover 150, along one or more sides 190 of the inner cover 150, or any where about a periphery 200 of the inner cover 150. The apertures 170 may be in the form of holes, slots, or any shape in any size. Alternatively, the inner cover 150 may take the form of a grill 210 positioned about the periphery 200 as is shown in FIG. 3. Likewise, the grill 210 may have any shape or size of the apertures 170 therein. Any number of the apertures 170 may be used. Apertures 170 of differing sizes and shapes also may be used herein together.

The outer cover 160 may enclose the inner cover 150 and define an outer airspace 220 therebetween. The size, shape, and diameter of the outer airspace 220 may vary. One or more outlets 230 may be positioned on the outer cover 160. The outlets 230 may be in communication with an oil sump pump or other type of exit. Other configurations and other types of components may be used herein.

In use, a flow of air 240 about the rotor coupling 130 may be heated by friction with the rotor coupling 130. This flow of air 240, however, may be pumped out of the inner air space 165 and through the apertures 170 of the inner cover 150 and into the outer air space 220 due to rotation of the rotor coupling 130. The flow of air 240 may flow circumferentially in the outer airspace 220 between the inner cover 150 and the outer cover 160 and then may escape via the outlet 230. The flow of air 240 may be moist and may include oil and/or other types of cooling fluids therein due to the hydraulic bolts 135 or other cooling sources. The outlet 230 of the outer cover 160 thus may be in communication with an oil sump pump and the like. Other configurations may be used herein.

The rotor coupling guard 140 thus provides good ventilation to the rotor coupling 130. Specifically, the rotor coupling guard 140 provides the normally trapped flow of air 240 with an escape route through the apertures 170 of the inner cover 150 and the outlet 230 of the outer cover 160 so as to reduce the air temperature about the rotor coupling 130. The rotor coupling guard 140 uses the pumping action of the rotor coupling 120 itself to force the flow of air 240 outward.

The rotor coupling guard 130 may be used for all types of couplings that may require external cooling. The costs associated with the existing oil cooling systems thus also may be reduced. The rotor coupling guard 140 maintains the coupling temperature within standard design limits and helps in the proper functioning of the hydraulic bolts 135 and the like. Noise about the rotor coupling 130 also may be reduced.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A rotor coupling guard for use with removing a flow of air about a rotor coupling of a turbo-machine, the rotor coupling guard comprising:
an inner cover surrounding the rotor coupling, wherein the inner cover comprises a plurality of apertures, and wherein the rotor coupling and the inner cover define an inner airspace therebetween; and
an outer cover surrounding the inner cover, wherein the outer cover comprises an outlet, and wherein the inner cover and the outer cover define an outer airspace therebetween such that rotation of the rotor coupling forces the flow of air from the inner airspace, through the plurality of apertures in the inner cover, into the outer airspace, and then through the outlet.

2. The rotor coupling guard of claim 1, wherein the inner cover comprises a grill about a periphery thereof and wherein the grill comprises the plurality of apertures therein.

3. The rotor coupling guard of claim 1, wherein one or more of the plurality of apertures are positioned about a top portion of the inner cover.

4. The rotor coupling guard of claim 1, wherein one or more of the plurality of apertures are positioned about one or more sides of the inner cover.

5. The rotor coupling guard of claim 1, wherein one or more of the plurality of apertures are positioned about a periphery of the inner cover.

6. The rotor coupling guard of claim 1, wherein the plurality of apertures comprises a plurality of apertures with differing sizes and shapes.

7. A method of cooling a rotor coupling positioned within a rotor coupling guard, comprising:
positioning an inner cover of the rotor coupling guard around the rotor coupling to define an inner airspace between the rotor coupling and the inner cover;
wherein the inner cover of the rotor coupling guard comprises a plurality of apertures therein;
positioning an outer cover of the rotor coupling guard around the inner cover to define an outer airspace between the inner cover and the outer cover, wherein the outer cover comprises an outlet; and
rotating the rotor coupling so as to force a flow of air about the rotor coupling and in the inner airspace through the plurality of apertures in the inner cover, into the outer airspace, and then through the outlet.

8. The method of claim 7, further comprising the step of positioning the plurality of apertures about a grill surrounding a periphery of the inner cover.

9. The method of claim 7, further comprising the step of positioning the plurality of apertures about a top portion of the inner cover.

10. The method of claim 7, further comprising the step of positioning the plurality of apertures about one or more sides of the inner cover.

11. The method of claim 7, further comprising the step of positioning the plurality of apertures about a periphery of the inner cover.

12. A turbo-machine, comprising:
a rotor coupling; and
a rotor coupling guard with the rotor coupling positioned therein, the rotor coupling guard comprising:
an inner cover surrounding the rotor coupling, wherein the inner cover comprises a plurality of apertures, and wherein the rotor coupling and the inner cover define an inner airspace therebetween; and
an outer cover surrounding the inner cover, wherein the inner cover and the outer cover define an outer airspace therebetween, wherein the outer cover comprises an outlet, and wherein rotation of the rotor coupling forces a flow of air from the inner airspace, through the plurality of apertures in the inner cover, into the outer airspace, and then through the outlet.

13. The turbo-machine of claim 12, wherein the inner cover comprises a grill about a periphery thereof and wherein the grill comprises the plurality of apertures therein.

14. The turbo-machine of claim 12, wherein one or more of the plurality of apertures are positioned about a top portion of the inner cover.

15. The turbo-machine of claim 12, wherein one or more of the plurality of apertures are positioned about one or more sides of the inner cover.

* * * * *